United States Patent
Veilleux et al.

(10) Patent No.: US 7,427,193 B2
(45) Date of Patent: *Sep. 23, 2008

(54) METHOD AND APPARATUS FOR FORMING A GOLF BALL

(75) Inventors: Thomas A. Veilleux, Charlton, MA (US); Vincent J. Simonds, Brimfield, MA (US); David M. Melanson, Northampton, MA (US); Quansheng Lu, Newton, MA (US)

(73) Assignee: Callaway Golf Company, Carlsbad, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 11/275,132

(22) Filed: Dec. 13, 2005

(65) Prior Publication Data

US 2006/0082020 A1    Apr. 20, 2006

Related U.S. Application Data (60) Continuation-in-part of application No. 10/900,488, filed on Jul. 28, 2004, which is a division of application No. 10/305,680, filed on Nov. 27, 2002, now Pat. No. 6,817,853, application No. 11/275,132, which is a continuation-in-part of application No. 10/305,680, filed on Nov. 27, 2002, now Pat. No. 6,817,853.

(60) Provisional application No. 60/422,423, filed on Oct. 30, 2002, provisional application No. 60/356,400, filed on Feb. 11, 2002, provisional application No. 60/337,123, filed on Dec. 4, 2001.

(51) Int. Cl.
*B29C 45/14* (2006.01)

(52) U.S. Cl. ............... 425/116; 425/125; 425/129.1; 425/577

(58) Field of Classification Search .......... 425/116, 425/125, 129.1, 577
See application file for complete search history.

(56) References Cited

U.S. PATENT DOCUMENTS

| | | | |
|---|---|---|---|
| 2,361,348 A * | 10/1944 | Dickson et al. ......... 264/278 |
| 2,741,480 A | 4/1956 | Smith |
| 2,973,800 A | 3/1961 | Muccino |
| 3,053,539 A | 9/1962 | Picchowski |
| 3,264,272 A | 8/1966 | Rees |
| 3,313,545 A | 4/1967 | Bartsch |
| 3,373,123 A | 3/1968 | Brice |
| 3,384,612 A | 5/1968 | Brandt et al. |
| 3,395,109 A | 7/1968 | Molitor et al. |
| 3,458,205 A | 7/1969 | Smith et al. |
| 3,502,338 A | 3/1970 | Cox |
| 3,534,965 A | 10/1970 | Harrison et al. |
| 3,572,721 A | 3/1971 | Harrison et al. |
| 3,883,145 A | 5/1975 | Cox et al. |

(Continued)

*Primary Examiner*—Robert B Davis
(74) *Attorney, Agent, or Firm*—Michael A. Catania; Elaine H. Lo (57) ABSTRACT

Molding equipment and related techniques for forming a golf ball are disclosed. The golf ball comprises a core and a cover layer, wherein the cover layer provides one or more deep dimples that extend through the cover layer to and/or into a layer or component underneath are disclosed. The molding equipment provides one or more selectively positionable knock-out pins along the surface of the molding chamber. These pins are specially tailored such that subsequent to molding, the resulting voids are traditional or deep dimples. The molding equipment and related processes are particularly useful when forming the various layers by reaction injection molding.

6 Claims, 9 Drawing Sheets

U.S. PATENT DOCUMENTS

| | | | |
|---|---|---|---|
| 3,979,126 A | 9/1976 | Dusbiber | |
| 3,989,568 A | 11/1976 | Isaac | |
| 4,076,255 A | 2/1978 | Moore et al. | |
| 4,085,937 A | 4/1978 | Schenk | |
| 4,123,061 A | 10/1978 | Dusbiber | |
| 4,190,711 A | 2/1980 | Zdrahala et al. | |
| 4,218,543 A | 8/1980 | Weber et al. | |
| 4,248,432 A | 2/1981 | Hewitt et al. | |
| 4,272,079 A | 6/1981 | Nakade et al. | |
| 4,274,637 A | 6/1981 | Molitor | |
| 4,337,946 A | 7/1982 | Saito et al. | |
| 4,431,193 A | 2/1984 | Nesbitt | |
| 4,442,282 A | 4/1984 | Kolycheck | |
| 4,570,937 A | 2/1986 | Yamada | |
| 4,582,887 A | 4/1986 | Dominguez et al. | |
| 4,590,219 A | 5/1986 | Nissen et al. | |
| 4,607,090 A | 8/1986 | Dominguez | |
| 4,650,193 A | 3/1987 | Molitor et al. | |
| 4,674,751 A | 6/1987 | Molitor et al. | |
| 4,679,795 A | 7/1987 | Melvin et al. | |
| 4,688,801 A | 8/1987 | Reiter | |
| 4,690,981 A | 9/1987 | Slatz | |
| 4,695,055 A | 9/1987 | Newcomb et al. | |
| 4,714,253 A | 12/1987 | Nakahara et al. | |
| 4,762,322 A | 8/1988 | Molitor et al. | |
| 4,798,386 A | 1/1989 | Berard | |
| 4,848,770 A | 7/1989 | Shama | |
| 4,852,884 A | 8/1989 | Sullivan | |
| 4,858,923 A | 8/1989 | Gobush et al. | |
| 4,858,924 A | 8/1989 | Saito et al. | |
| 4,878,674 A | 11/1989 | Newcomb et al. | |
| 4,884,814 A | 12/1989 | Sullivan | |
| 4,911,451 A | 3/1990 | Sullivan et al. | |
| 4,919,434 A | 4/1990 | Saito | |
| 4,957,297 A | 9/1990 | Newcomb et al. | |
| 4,979,746 A | 12/1990 | Gentiluomo | |
| 4,984,804 A | 1/1991 | Yamada et al. | |
| 4,986,545 A | 1/1991 | Sullivan | |
| 5,002,281 A | 3/1991 | Nakahara et al. | |
| 5,006,297 A | 4/1991 | Brown et al. | |
| 5,019,319 A | 5/1991 | Nakamura et al. | |
| 5,026,067 A | 6/1991 | Gentiluomo | |
| 5,035,425 A | 7/1991 | Edwards | |
| 5,045,591 A | 9/1991 | Meyer et al. | |
| 5,048,838 A | 9/1991 | Chikaraishi et al. | |
| 5,068,151 A | 11/1991 | Nakamura | |
| 5,072,944 A | 12/1991 | Nakahara et al. | |
| 5,096,201 A | 3/1992 | Egashira et al. | |
| 5,098,105 A | 3/1992 | Sullivan | |
| 5,104,126 A | 4/1992 | Gentiluomo | |
| 5,120,791 A | 6/1992 | Sullivan | |
| 5,142,835 A | 9/1992 | Mrocca | |
| 5,147,657 A * | 9/1992 | Giza | 425/117 |
| 5,150,906 A | 9/1992 | Molitor et al. | |
| 5,156,405 A | 10/1992 | Kitaoh et al. | |
| 5,184,828 A | 2/1993 | Kim et al. | |
| 5,187,013 A | 2/1993 | Sullivan | |
| 5,197,740 A | 3/1993 | Pocklington et al. | |
| 5,219,973 A | 6/1993 | Stack et al. | |
| 5,222,739 A | 6/1993 | Horiuchi et al. | |
| 5,244,969 A | 9/1993 | Yamada | |
| 5,253,871 A | 10/1993 | Viollaz | |
| 5,273,286 A | 12/1993 | Sun | |
| 5,273,287 A | 12/1993 | Molitor et al. | |
| 5,274,041 A | 12/1993 | Yamada | |
| 5,281,651 A | 1/1994 | Arjunan et al. | |
| 5,300,334 A | 4/1994 | Niederst et al. | |
| 5,304,608 A | 4/1994 | Yabuki et al. | |
| 5,306,760 A | 4/1994 | Sullivan | |
| 5,312,857 A | 5/1994 | Sullivan | |
| 5,314,187 A | 5/1994 | Proudfit | |
| 5,324,783 A | 6/1994 | Sullivan | |
| 5,330,837 A | 7/1994 | Sullivan | |
| 5,334,673 A | 8/1994 | Wu | |
| 5,338,610 A | 8/1994 | Sullivan | |
| 5,368,304 A | 11/1994 | Sullivan et al. | |
| 5,368,806 A | 11/1994 | Harasin et al. | |
| 5,387,750 A | 2/1995 | Chiang | |
| 5,403,010 A | 4/1995 | Yabuki et al. | |
| 5,439,227 A | 8/1995 | Egashira et al. | |
| 5,480,155 A | 1/1996 | Molitor et al. | |
| 5,482,285 A | 1/1996 | Yabuki et al. | |
| 5,484,870 A | 1/1996 | Wu | |
| 5,490,673 A | 2/1996 | Hiraoka | |
| 5,490,674 A | 2/1996 | Hamada et al. | |
| 5,492,972 A | 2/1996 | Stefani | |
| 5,553,852 A | 9/1996 | Higuchi et al. | |
| 5,586,950 A | 12/1996 | Endo | |
| 5,628,699 A | 5/1997 | Maruko et al. | |
| 5,668,239 A | 9/1997 | Nodelman et al. | |
| 5,674,137 A | 10/1997 | Maruko et al. | |
| 5,688,191 A | 11/1997 | Cavallaro et al. | |
| 5,692,974 A | 12/1997 | Wu et al. | |
| 5,730,665 A | 3/1998 | Shimosaka et al. | |
| 5,733,206 A | 3/1998 | Nesbitt et al. | |
| 5,733,207 A | 3/1998 | Sullivan et al. | |
| 5,733,428 A | 3/1998 | Calabria et al. | |
| 5,739,247 A | 4/1998 | Lesko et al. | |
| 5,739,253 A | 4/1998 | Nodelman et al. | |
| 5,750,580 A | 5/1998 | Mayer et al. | |
| 5,759,676 A | 6/1998 | Cavallaro et al. | |
| 5,779,561 A | 7/1998 | Sullivan et al. | |
| 5,779,562 A | 7/1998 | Melvin et al. | |
| 5,779,563 A | 7/1998 | Yamagishi et al. | |
| 5,783,293 A | 7/1998 | Lammi | |
| 5,792,008 A | 8/1998 | Kakiuchi et al. | |
| 5,797,808 A | 8/1998 | Hayashi et al. | |
| 5,800,284 A | 9/1998 | Sullivan et al. | |
| 5,803,831 A | 9/1998 | Sullivan et al. | |
| 5,810,678 A | 9/1998 | Cavallaro et al. | |
| 5,813,923 A | 9/1998 | Cavallaro et al. | |
| 5,816,937 A | 10/1998 | Shimosaka et al. | |
| 5,820,488 A | 10/1998 | Sullivan et al. | |
| 5,820,489 A | 10/1998 | Sullivan et al. | |
| 5,820,491 A | 10/1998 | Hatch et al. | |
| 5,827,167 A | 10/1998 | Dougan et al. | |
| 5,827,548 A * | 10/1998 | Lavallee et al. | 425/116 |
| 5,830,087 A | 11/1998 | Sullivan et al. | |
| 5,833,553 A | 11/1998 | Sullivan et al. | |
| 5,833,554 A | 11/1998 | Sullivan et al. | |
| 5,836,833 A | 11/1998 | Shimosaka et al. | |
| 5,849,168 A | 12/1998 | Lutz | |
| 5,849,237 A * | 12/1998 | Inoue | 264/319 |
| 5,856,388 A | 1/1999 | Harris et al. | |
| 5,863,264 A | 1/1999 | Yamagishi et al. | |
| 5,873,796 A | 2/1999 | Cavallaro et al. | |
| 5,885,172 A | 3/1999 | Hebert et al. | |
| 5,888,437 A | 3/1999 | Calabria et al. | |
| 5,891,973 A | 4/1999 | Sullivan et al. | |
| 5,897,884 A | 4/1999 | Calabria et al. | |
| 5,899,822 A | 5/1999 | Yamagishi et al. | |
| 5,902,192 A | 5/1999 | Kashiwagi et al. | |
| 5,908,358 A | 6/1999 | Wu | |
| 5,919,100 A | 7/1999 | Boehm et al. | |
| 5,919,862 A | 7/1999 | Rajagopalan et al. | |
| 5,922,252 A | 7/1999 | Stanton et al. | |
| 5,929,189 A | 7/1999 | Ichikawa et al. | |
| 5,935,021 A | 8/1999 | Kashiwagi et al. | |
| 5,947,842 A | 9/1999 | Cavallaro et al. | |
| 5,947,843 A | 9/1999 | Calabria et al. | |
| 6,817,853 B2 * | 11/2004 | Simonds et al. | 425/116 |

* cited by examiner

METHOD AND APPARATUS FOR FORMING A GOLF BALL

CROSS REFERENCES TO RELATED APPLICATIONS

This application is a continuation-in-part application of U.S. patent application Ser. No. 10/900,488, filed Jul. 28, 2004, which is a divisional of U.S. patent application Ser. No. 10/305,680, filed Nov. 27, 2002, now U.S. Pat. No. 6,817,153; this application is also a continuation-in-part application of U.S. patent application Ser. No. 10/305,680, which claims priority upon U.S. Provisional Application No. 60/337,123, filed Dec. 4, 2001; U.S. Provisional Application No. 60/356,400, filed Feb. 11, 2002; and U.S. Provisional Application No. 60/422,423, filed Oct. 30, 2002.

STATEMENT REGARDING FEDERALLY SPONSORED RESEARCH OR DEVELOPMENT

Not Applicable

BACKGROUND OF THE INVENTION

1. Field of the Invention

The present invention relates to a method and apparatus for forming a golf ball.

2. Description of the Related Art

A number of two-piece (a solid resilient center or core with a molded cover) and multi-layer (liquid or solid center and multiple mantle and/or cover layers) golf balls have been produced. Different types of materials and/or processing parameters have been utilized to formulate the cores, covers, etc. of these balls, which dramatically alter the balls' overall characteristics. In addition, multi-layer covers of different materials have also been formulated in an attempt to produce a golf ball having the overall distance, playability and durability characteristics desired.

For certain applications it is desirable to produce a golf ball having a very thin cover layer. However, due to equipment limitations, it is often very difficult to mold a thin cover. Accordingly, it would be beneficial to provide an apparatus and technique for producing a relatively thin outer cover layer.

Moreover, retractable pins have been utilized to hold, or center, the core or core and mantle and/or cover layer(s) in place while molding an outer cover layer thereon. However, these pins have only been utilized to support the core during molding and have not contributed to the outer appearance of the ball. In fact, conventional pins sometimes produce centering difficulties and cosmetic problems (i.e. pin flash, pin marks, etc.) during retraction, which in turn require additional handling to produce a golf ball suitable for use and sale. Accordingly, it would be desirable to provide an apparatus and method for forming a cover layer on a golf ball with retractable pins that overcame the problems associated with conventional pins.

BRIEF SUMMARY OF THE INVENTION

The present invention is directed to processes and apparatuses for forming golf balls with deep apertures by utilizing one or more specifically tailored "knock-out" pins that serve to support the core or ball assembly during molding. The pins also assist in removing the ball from the mold and in forming deep apertures in the mold ball. The pins are also preferably used in combination with other features in the mold to form deep dimples in the resulting ball. The specifically tailored pins reduce demolding time and reduce or minimize cosmetic damage to the golf ball.

An aspect of the invention is to provide equipment and methods for forming a golf ball having a dimpled cover that is thinner than traditional cover layers with one or more deep dimples.

Another aspect of the invention is to provide equipment and methods for forming a golf ball having dimples in an outer cover layer that extend to, and/or into at least the next inner layer of the ball.

Yet another aspect of the invention is to provide equipment and methods for forming a golf ball core or intermediate ball assembly that in many instances may be readily removed from a molding assembly.

Another aspect of the invention is to provide novel molding equipment that simplifies manufacturing of golf balls and components thereof. The equipment utilizes one or more specifically tailored "knock-out" pins that serve to support the core or ball during molding, assist in removing the molded ball from the mold, and form traditional dimples and/or deep dimples in the ball. These particularly tailored pins are preferably used in conjunction with other features in the mold to form deep dimples in the resulting ball.

In a further aspect, the present invention provides a molding apparatus adapted for forming a golf ball having one or more deep dimples. The apparatus comprises an upper mold having a first hemispherical molding surface that defines a hemispherical molding cavity, and at least one aperture defined along the first molding surface. The upper mold further has, in each of the apertures, a selectively positionable pin having a distal end that may be extended into the cavity or retracted from the cavity. The molding apparatus further comprises a lower mold having a second hemispherical molding surface that defines a hemispherical molding cavity and at least one aperture defined along the second molding surface. The lower mold further has, in each of the apertures, a selectively positionable pin having a distal end that may be extended into the cavity or retracted therefrom. The upper mold and the lower mold are adapted to engage each other such that the first molding surface and the second molding surface form a generally spherical molding chamber. The pins in each of the apertures defined in the upper mold and lower mold extend into the molding chamber a distance of from about 0.002 inch to about 0.140 inch as measured from the respective first or second molding surface while in their retracted position. The pins remain in the retracted position during a molding operation so as to form a corresponding number of traditional dimples or deep dimples in the resulting golf ball.

In another aspect, the present invention provides a molding apparatus adapted to form a golf ball with a plurality of deep dimples along an outer surface of the ball. The apparatus comprises a first mold including a first hemispherical molding surface defining a first molding cavity and at least one aperture defined along the first molding surface. The first molding surface has at least one raised protuberance adapted to form a deep dimple. The first mold further includes, in each of the apertures, a selectively positionable pin having a distal end that may be extended into the first cavity or retracted from the first cavity. The molding apparatus further includes a second mold having a second hemispherical molding surface that defines a second molding cavity and at least one aperture defined along the second molding surface. The second molding surface has at least one raised protuberance adapted to form a deep dimple. The second mold further includes, in each of the apertures, a selectively positionable pin having a distal end that may be extended into the second cavity or retracted from the second cavity. The first mold and the second mold are adapted to engage each other such that the first molding surface and the second molding surface form a generally spherical molding chamber. At least a portion of the raised protuberances in the first and second molding surfaces have a height, as measured from their respective molding surface, of from about 0.002 inch to about 0.140 inch.

In yet another aspect, the present invention provides a molding apparatus adapted for forming a golf ball with a plurality of deep dimples along an outer surface of the golf ball. The apparatus comprises a first mold including a first hemispherical molding surface defining a first molding cavity and at least one aperture defined along the first molding surface. The first molding surface has at least one raised protuberance adapted to form a deep dimple. The first mold further includes, in each of the apertures, a selectively positionable pin having a distal end that may be extended into the first cavity or retracted from the first cavity. Each of the pins associated with the first mold are positionable such that the distal end extends into the first molding chamber a distance of from about 0.002 inch to about 0.140 inch as measured from the first molding surface. The molding apparatus further comprises a second mold including a second hemispherical molding surface defining a second molding cavity and at least one aperture defined along the second molding surface. The second molding surface has at least one raised protuberance adapted to form a deep dimple. The second mold further includes, in each of the apertures, a selectively positionable pin having a distal end that may be extended into the second cavity or retracted therefrom. Each of the pins associated with the second mold is positionable such that the distal end of the pin extends into the second molding chamber a distance of from about 0.002 inch to about 0.140 inch as measured from the second molding surface. Each of the first and second molds is adapted to engage each other such that the first molding surface and the second molding surface form a generally spherical molding chamber. At least a portion of the raised protuberances in the first and second molding surfaces have a height, as measured from their respective molding surface, of from about 0.002 inch to about 0.140 inch.

In yet a further aspect, the present invention provides a process for forming a golf ball having a plurality of deep dimples. The process comprises a step of providing a molding apparatus having an upper mold including a first molding surface that defines at least one aperture. The upper mold further includes a selectively positionable pin in each of the apertures. The molding apparatus also includes a lower mold including a second molding surface that defines at least one aperture and also including a selectively positionable pin in each of the apertures. The pins of the upper and lower molds have a distal end that may be extended past the respective first and second molding surfaces. The upper and lower molds are adapted to engage each other such that the first molding surface and the second molding surface form a generally spherical molding chamber. The process also comprises a step of positioning a golf ball core or intermediate ball assembly within the molding chamber. While in the retracted position, the distal end of at least one the pins within the molding chamber contacts the golf ball core assembly or intermediate ball assembly to thereby form a traditional dimple or a deep dimple. The process includes an additional step of introducing a molding material within the molding chamber and around the golf ball core or intermediate ball assembly to thereby form a layer of material around the golf ball core or intermediate ball assembly. The process includes another step of at least partially hardening (curing) the molding material. And, the process includes a step of extending one or more pins to thereby remove the resulting ball assembly from the mold.

In yet another aspect, the present invention provides a process for forming a golf ball having a plurality of deep dimples. The process comprises a step of providing a molding apparatus having an upper mold including a first molding surface that defines a first raised protuberance adapted to form a deep dimple and at least one aperture. The upper mold includes a selectively positionable pin in each of the apertures. The molding apparatus includes a lower mold having a second molding surface that defines a second raised protuberance adapted to form a deep dimple and at least one aperture. The lower mold further includes a selectively positionable pin in each of the apertures. The pins of the upper and lower molds have a distal end that may be extended past the respective first and second molding surface. The upper and lower molds are adapted to engage each other such that the first molding surface and the second molding surface form a generally spherical molding chamber. The process includes a step of positioning a golf ball core or intermediate ball assembly within the molding chamber. The distal end of at least one of the pins contacts the golf ball core or intermediate ball assembly while in the retracted position to thereby form a traditional dimple or deep dimple. The process further includes a step of introducing a molding material within the molding chamber and around a golf ball core or intermediate ball assembly to thereby form a layer of the molding material around a golf ball core or intermediate ball assembly. The process includes a step of at least partially hardening the molding material. And, the process includes a step of extending the pins to thereby remove the resulting ball assembly from the mold.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The apparatus and method of the present invention is utilized in forming a cover for a golf ball. Preferably, the cover is formed over a core or core and mantle layer. A preferred method of forming the cover is using reaction injection molding, such as disclosed in Keller et al., U.S. Pat. No. 6,855,073 for a Golf Ball Which Includes Fast-Chemical-Reaction-Produced Component And Method Of Making Same, which is hereby incorporated by reference in its entirety. Alternative cover forming processes that may be utilized with the present invention include, but are not limited to, injection molding, transfer molding, liquid injection molding, casting, compression molding, and the like.

Figure 1:
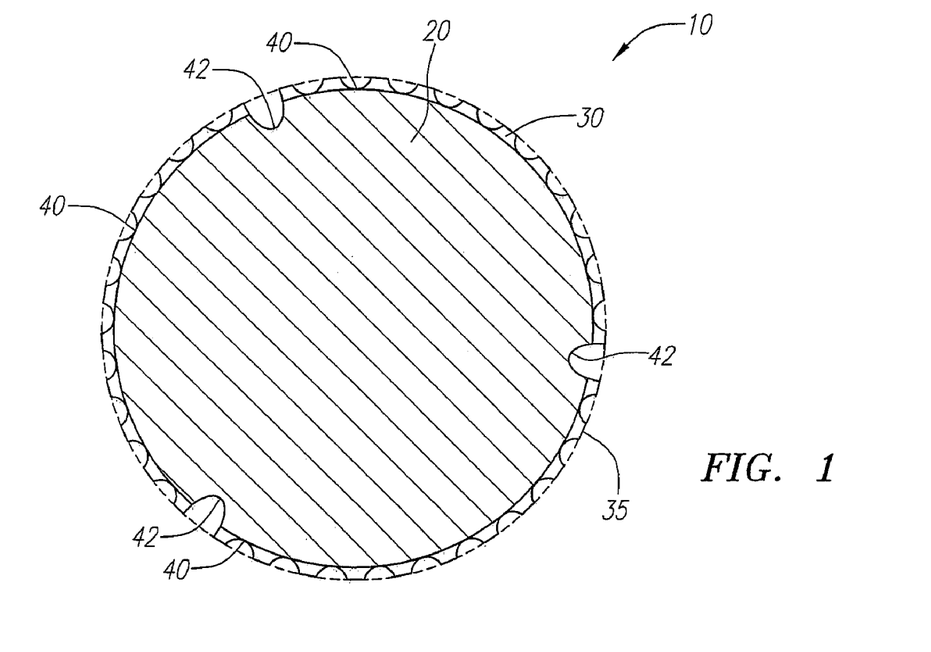
FIG. 1 is a cross-sectional view of a golf ball having a core and a cover having dimples and deep apertures extending through the cover.
Figure 2:
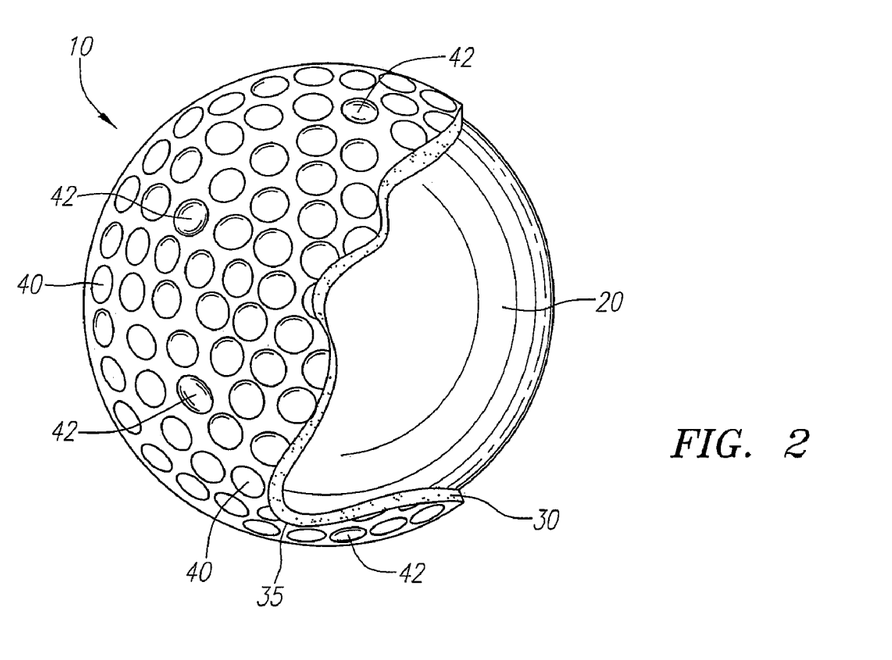
FIG. 2 is a diametrical cross-sectional view of the golf ball illustrated in FIG. 1.

As shown in FIGS. 1 and 2, a golf ball formed using the apparatus and method of the present invention is generally designated 10. The golf ball 10 has a cover 30 and a core 20. The cover 30 has a plurality of dimples 40 formed in a surface of the cover 30. The surface of the cover 30 also has a plurality of deep apertures 42 which extend through the cover 30 and into the core 20. In a preferred embodiment, the deep apertures 42 extend through the cover 30. A more thorough explanation of the deep apertures is set forth in Simonds et al., U.S. Pat. No. 6,817,853 for Molding Processes And Equipment For Forming Golf Balls With Deep Dimples, which is hereby incorporated by reference in its entirety. Those skilled in the pertinent art will recognize that the golf ball 10 may be a multi-layer golf ball without departing from the scope and spirit of the present invention.

The core is supported by one or more, preferably two or more, support pins or protrusions which form the deep apertures that contact the core or intermediate ball assembly. That is, the exterior surface of the support pins or protrusions form the inner surface of the deep apertures.

The number of deep apertures on a golf ball may vary as desired. Any number and pattern of deep apertures may be used, although a limited number of deep apertures in a specific geometric pattern are preferred. The geometric pattern is preferably approximately centered about the pole of the ball. Given the limited number of coordinates or points, it is generally not possible to exactly center certain geometric patterns with some shapes, such as a triangle. Additionally, it may be desirable to shift the pattern slightly to accommodate different forces on different sides of the ball.

The deep aperture locations may be anywhere on the ball, such as at about 30 degrees latitude on each hemisphere, about 40 to 45 degrees latitude, about 50 to 60 degrees latitude, and the like. The deep apertures are preferably within a region along the outer surface of a ball from about 30 degrees latitude to about 60 degrees latitude in either or both hemispheres. Most preferably, the deep apertures are located at about 40 to 45 degrees latitude or more on each hemisphere. As used herein, latitude refers to the location of the dimple on the ball, with the equator defined as 0 degrees latitude, and each pole of the ball defined as 90 degrees latitude.

The core, preferably a solid core, for the ball is preferably about 1.2 inches to about 1.66 inches in diameter, although it may be possible to use cores in the range of about 1.0 to 2.0 inches. If the ball has a single cover layer, the core size may be up to about 1.660 inches.

If the golf ball is a multi-layer golf ball, the mantle layer is preferably about 0.0005 inch to about 0.15 inch in thickness. The inner ball assembly that includes the core and the mantle layer, or core for a two piece ball, preferably has a diameter in the range of 1.25 to 1.70 inches. The cover layer is preferably about 0.005 inch to about 0.045 inch thick. The golf ball 10 preferably has a diameter of 1.680 inches or more, the minimum diameter permitted by the rules of the U.S.G.A and weighing no more than 1.62 ounces. If desired, golf balls of different weights and diameters may also be formed if the rules of the U.S.G.A. are not an issue.

In a particularly preferred embodiment, a golf ball with a dimple pattern that provides dimple coverage of 65% or more, preferably 75% or more, and more preferably about 80 to 85% or more, is formed using the method and apparatus of the present invention. A golf ball formed using the method and apparatus of the present invention preferably has from 300 to less than 500 dimples, preferably from about 330 to about 440 dimples. Alternatively, a golf ball having a tubular lattice network is formed from the method and apparatus of the present invention. Such a golf ball is disclosed in Ogg, U.S. Pat. No. 6,290,615 for A Golf Ball Having A Tubular Lattice Pattern, which is hereby incorporated by reference in its entirety.

Figure 3:
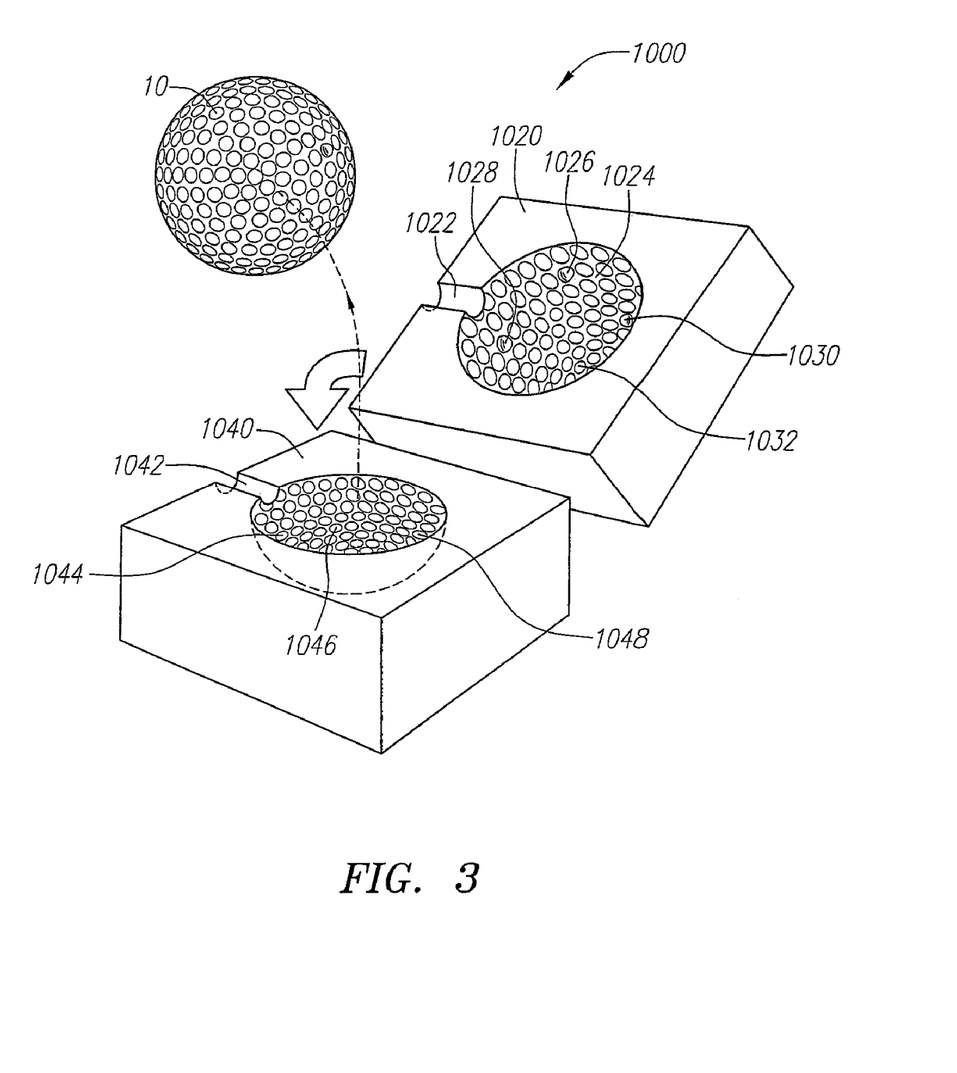
FIG. 3 is a schematic view of a preferred embodiment molding apparatus and a golf ball formed therein.

FIG. 3 illustrates a preferred embodiment molding apparatus 1000 in accordance with the present invention. The molding apparatus 1000 comprises a first mold half 1020 and a second mold half 1040 that each define a hemispherical portion of a molding chamber 1024 and 1044. Defined along the outer surface of the hemispherical portion of the molding chamber 1024, are a plurality of raised regions or protrusions 1032. These raised regions 1032 preferably form conventional dimples in a cover layer in a golf ball formed using molding apparatus 1000. Also provided along the outer surface of the hemispherical molding chamber 1024 are a plurality of outwardly extending raised regions, protrusions, or support pins 1026, 1028, and 1030. These raised regions are of a height greater than the height of the raised regions 1032. Specifically, the raised regions 1026, 1028, and 1030 form deep apertures as described herein. These raised regions 1026, 1028 and 1030 are used to retain and support a golf ball core or intermediate ball assembly placed in the mold. After molding a cover layer on the core or ball assembly, an unfinished golf ball 10 is produced. The ball 10 illustrated in FIG. 3 is depicted with a plurality of dimples or dimple portions formed along its outer surface. The ball also includes a plurality of deep apertures along its outer surface resulting from the raised regions 1026, 1028, and 1030. A passage 1022 is provided in the mold half 1020. The passage 1022 provides communication and a path for a flowable moldable material to be introduced into the molding chamber.

The second molding half 1040 defines a hemispherical molding chamber 1044 also having a plurality of raised regions, protrusions, or support pins along its outer surface. Specifically, raised regions 1046 and 1048 are provided similar to the previously described raised regions 1026, 1028, and 1030. The second molding half 1040 also defines a channel 1042 extending from the molding chamber 1044. Most preferably, the molding channel 1042 is aligned with channel 1022 of the first mold half 1020 when the molding apparatus 1000 is closed to provide a unitary passage providing communication between the molding chamber and the exterior of the molding apparatus 1000.

The cover for a golf ball formed by the method and apparatus of the present invention is preferably a polyurethane, polyurea, or polyurethane/polyurea material formed by reaction injection molding ("RIM"), such as described in Keller et al., U.S. Pat. No. 6,855,073 for a Golf Ball Which Includes Fast-Chemical-Reaction-Produced Component And Method Of Making Same, which is hereby incorporated by reference in its entirety.

Figure 4:
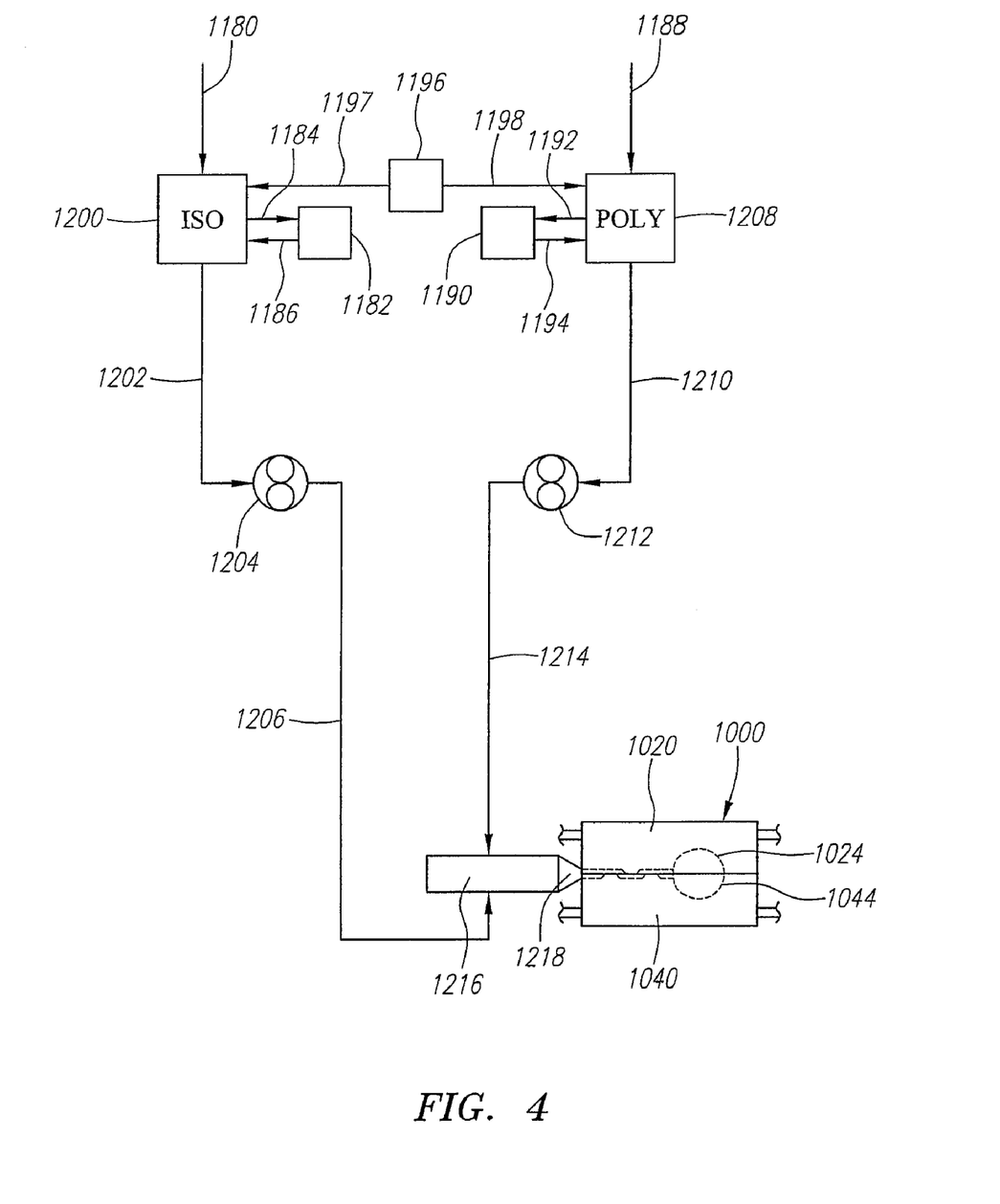
FIG. 4 is a process flow diagram that schematically depicts a reaction injection molding process.

FIG. 4 illustrates a process flow diagram for preferably forming a RIM cover in conjunction with the apparatus and method of the present invention. An isocyanate component from bulk storage is fed through line 1180 to an isocyanate tank 1200. The isocyanate component is heated to the desired temperature, e.g., 90° F. to about 170° F., by circulating it through heat exchanger 1182 via lines 1184 and 1186. A polyol component is conveyed from bulk storage to a polyol tank 1208 via line 1188. The polyol component is heated to the desired temperature, e.g., 90° F. to about 170° F., by circulating it through heat exchanger 1190 via lines 1192 and 1194. Dry nitrogen gas is fed from nitrogen tank 1196 to isocyanate tank 1200 via line 1197 and to polyol tank 1208 via line 1198. The isocyanate component is fed from isocyanate tank 1200 via line 1202 through a metering cylinder or metering pump 1204 into recirculation mix head inlet line 1206. The polyol component is fed from polyol tank 1208 via line 1210 through a metering cylinder or metering pump 1212 into a recirculation mix head inlet line 1214. The recirculation mix head 1216 receives the isocyanate component and the polyol component, mixes them, and provides for them to be fed through nozzle 1218 into the mold apparatus 1000. The molding apparatus 1000 has a first mold half 1020 and a second mold half 1040. The materials are preferably kept under controlled temperature conditions to insure that the desired reaction profile is maintained.

The polyol component typically contains additives, such as stabilizers, flow modifiers, catalysts, combustion modifiers, blowing agents, fillers, pigments, optical brighteners, and release agents to modify physical characteristics of the cover. Recycled polyurethane/polyurea also can be added to the core. Polyurethane/polyurea constituent molecules that were derived from recycled polyurethane can be added in the polyol component.

Inside the mix head 1216, injector nozzles impinge the isocyanate component and polyol component at ultra-high velocity to provide excellent mixing. Additional mixing preferably is conducted using an aftermixer, which typically is constructed inside the mold between the mix head and the mold cavity.

Figure 5:
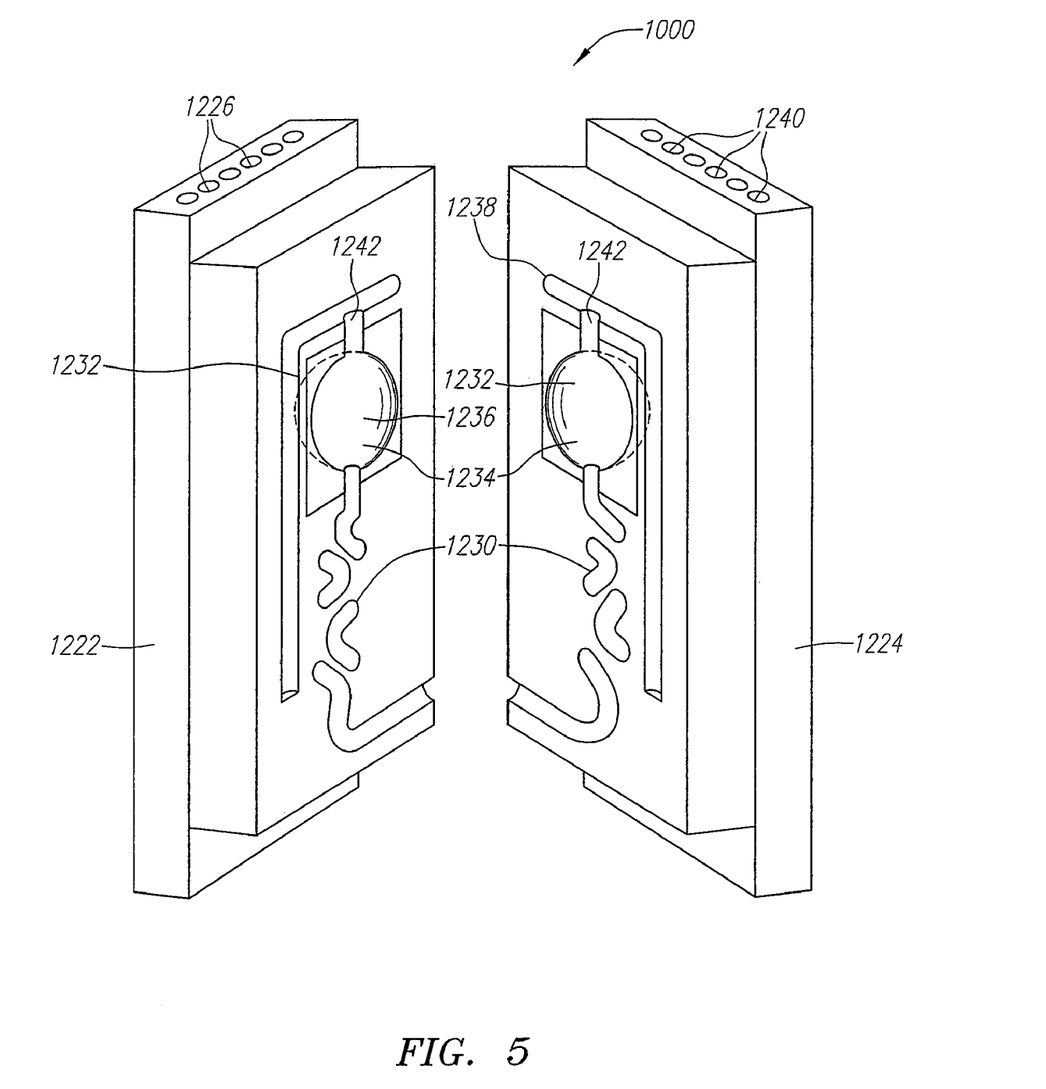
FIG. 5 schematically shows an alternative molding apparatus for reaction injection molding a golf ball cover.

As is shown in FIG. 5, a molding apparatus 1000 includes a golf ball cavity chamber 1232 in which a spherical golf ball mold 1234 with a dimpled, spherical mold cavity 1236 defined. The mold cavity 1236 is preferably provided with a plurality of raised regions that form deep apertures as described herein, and one or more retractable knock-out pins, as described in more detail below. An aftermixer 1230 is utilized for additional mixing of the reactants. An overflow channel 1238 receives overflow material from the golf ball mold 1234 through a shallow vent 1242. Heating/cooling passages 1226 and 1240, which preferably are in a parallel flow arrangement, carry heat transfer fluids such as water, oil, etc. through the top mold 1222 and the bottom mold 1224. Furthermore, the mold may be indirectly heated or heated directly via alternative technologies like electric cartridge heaters.

As previously noted, the present invention includes embodiments in which a molding apparatus provides one or more selectively positionable, i.e. retractable and extendible, "knock-out" pins along the surface of the molding chamber. These pins are specially tailored such that after their retraction after a molding operation, the resulting voids are deep dimples. The pins extend into the molding chamber within specific ranges of dimensions. The pins are also sized such that the resulting voids have the desired diameters, spans, and shapes. The one or more "knock-out" pins may preferably be used in conjunction with the previously described raised protuberances that also form deep dimples. The use of these specially tailored pins reduces cycle time and reduces or eliminates cosmetic damage to the golf ball cover.

Figure 6:
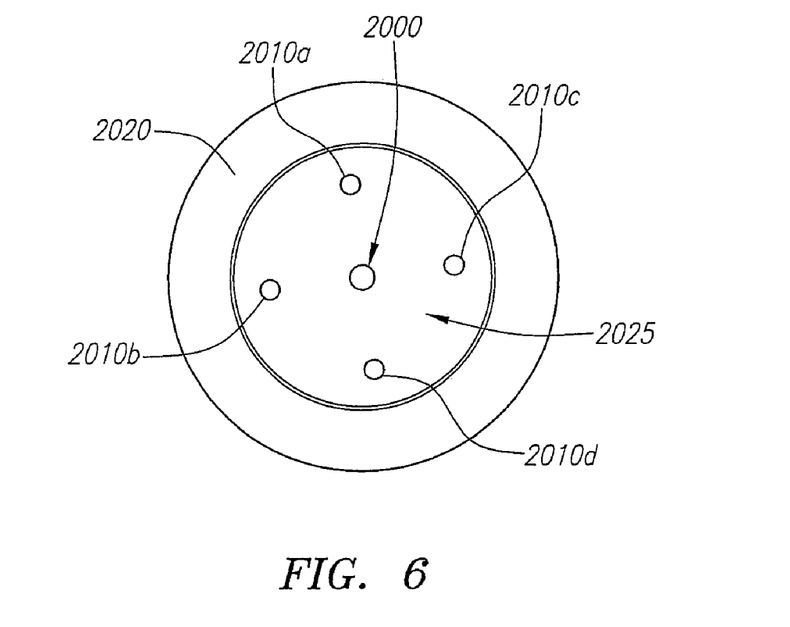
FIG. 6 is a schematic top view of a mold half of a molding apparatus according to the present invention.
Figure 7:
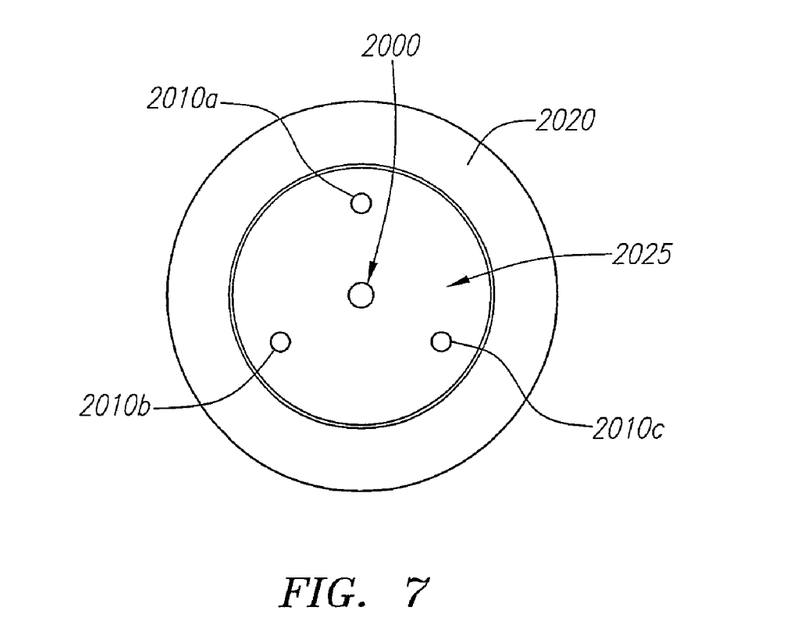
FIG. 7 is a schematic top view of an alternative mold half of a molding apparatus according to the present invention.

FIG. 6 is a schematic top view of a mold half 2020 of a preferred embodiment molding apparatus 1000 according to the present invention. In this embodiment, a plurality of raised projections 2010a-2010d hold a core or inner ball assembly within a molding chamber of the molding apparatus 1000 during the molding process. The plurality of raised projections 2010a-2010d will also form deep apertures in the cover of the golf ball. In this embodiment, each of the plurality of raised projections 2010a-2010d is located at approximately at 45 degrees latitude on the core or inner ball assembly. A knock-out pin or projection 2000 is preferably located at a pole of the golf ball. FIG. 7 illustrates an alternative embodiment of a mold half 2020 of a molding apparatus 1000 in which three raised projections 2010a-2010c are located at approximately 60 degrees latitude on the core or inner ball assembly.

Figure 8:
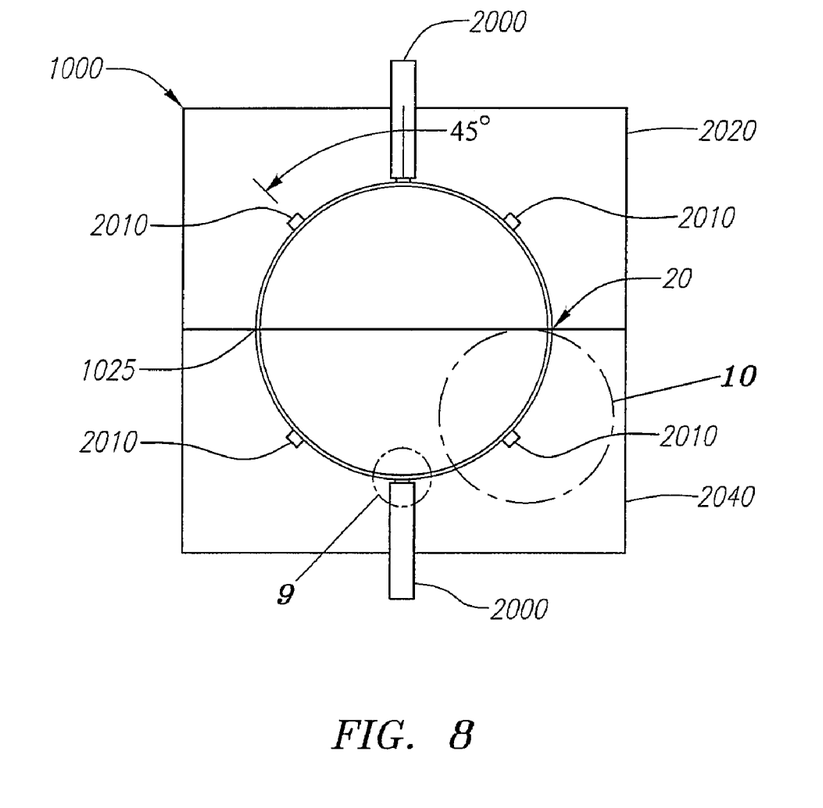
FIG. 8 is a schematic side view of the preferred embodiment molding apparatus.

As shown in FIG. 8, the molding apparatus 1000 comprises a first mold half 2020 and a second mold half 2040. The knock-out pins 2000 are preferably located at the poles and are movable within each of their respective apertures or guide channels formed within the molding apparatus 1000. Upon molding, a golf ball core 20 or other intermediate ball assembly is placed within the spherical molding chamber 1025 created by hemispherical molding surfaces defined in the first mold half 2020 and the second mold half 2040. The core and/or ball assembly is sized such that its diameter is slightly less than the internal diameter of the hemispherical molding cavity.

Figure 9:
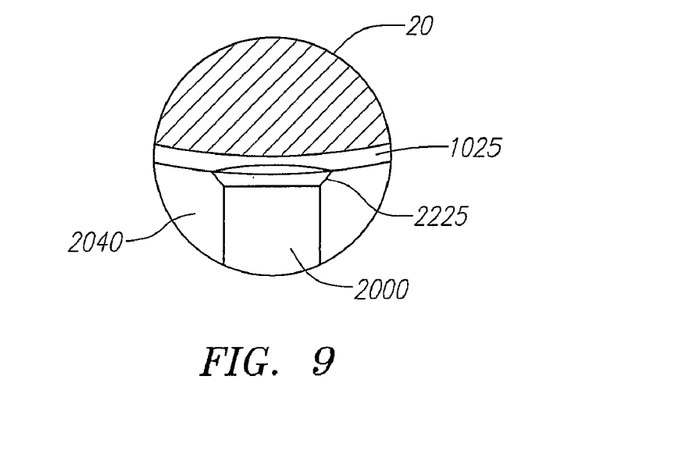
FIG. 9 is an isolated view of circle 9 of FIG. 8 with a knock-out pin in a retracted state.
Figure 9A:
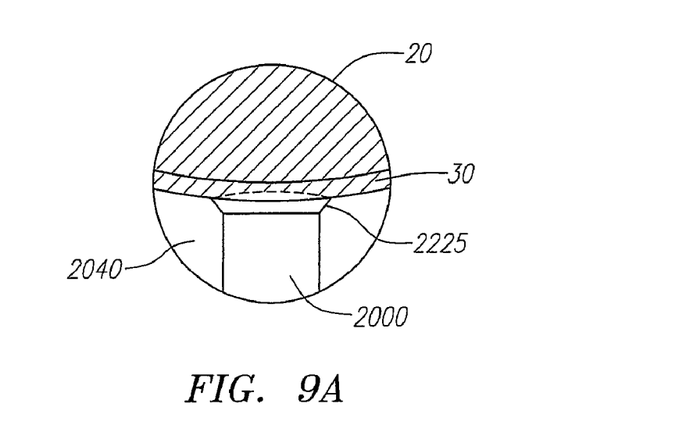
FIG. 9A is an isolated view of circle 9 of FIG. 8 with a knock-out pin in a retracted state during the molding process.
Figure 9B:
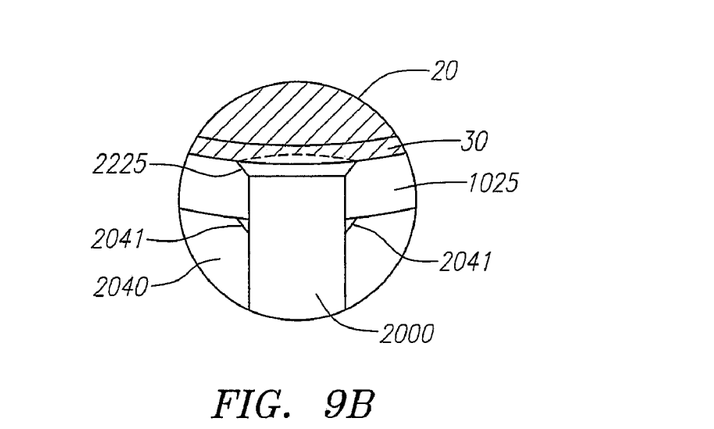
FIG. 9B is an isolated view of circle 9 of FIG. 8 with a knock-out pin in an extended state during the demolding process.

As shown in FIGS. 9, 9A and 9B, the knock-out pin 2000 is utilized to form a portion of the aerodynamic surface of the cover 30 of the golf ball 10, and is utilized to assist in de-molding the golf ball from the molding apparatus 1000 by extending towards the golf ball to "knock it out" of the molding chamber 1025 once the cover 30 is formed on the golf ball 10.

As shown in FIG. 9, the core 20 or other inner ball assembly is positioned on the plurality of raised projections 2010. The knock-out pin 2000 is in a retracted position within a barrel of the second mold half 2040. A distal end 2225 of the knock-out pin 2000 is shaped to form a dimple or other aerodynamic pattern in the cover 30. The distal end 2225 is preferably similar to the raised regions on the surface of the molding chamber 1025 which form the aerodynamic pattern for the golf ball. The distal end 2225 also forms a tight seal preventing flowable material from entering the barrel of the knock-out pin 2000.

As shown in FIG. 9A, the cover 30 is being formed over the core 20, and the distal end 2225 of the knock-out pin 2000 is forming a dimple in the cover 30. The molding chamber 1025 is filled with either the core 20 or the flowable material for forming the cover 30. The knock-out pin 2000 is still in the retracted position.

As shown in FIG. 9B, the cover 30 is formed and the molding apparatus 1000 has been opened for de-molding of the golf ball 10. The knock-out pin 2000 is now in the extended position, and forces the golf ball 10 from the molding chamber 1025. A recess 2041 of the second mold half 2040 in which a portion of the distal end 2225 resides during the molding process is shown. The recess 2041 allows for the tight seal to be formed during the molding process. The knock-out pin 2000 extends from 0.005 inch to 0.500 inch, more preferably from 0.010 inch to 0.250 inch. The knock-out pin 2000 seals tightly while in the retracted position, similar to the way an engine valve seals. The tight seal prevents the very low viscosity materials from flashing down the barrel of the knock-out pin 2000 and thereby fouling the knock-out pin 2000. Additionally, there is little or no witness line indicating where the knock-out pin 2000 engaged the golf ball 10 since the distal end 2225 of the knock-out pin 2000 is shaped like a dimple or other aerodynamic configuration.

Figure 10:
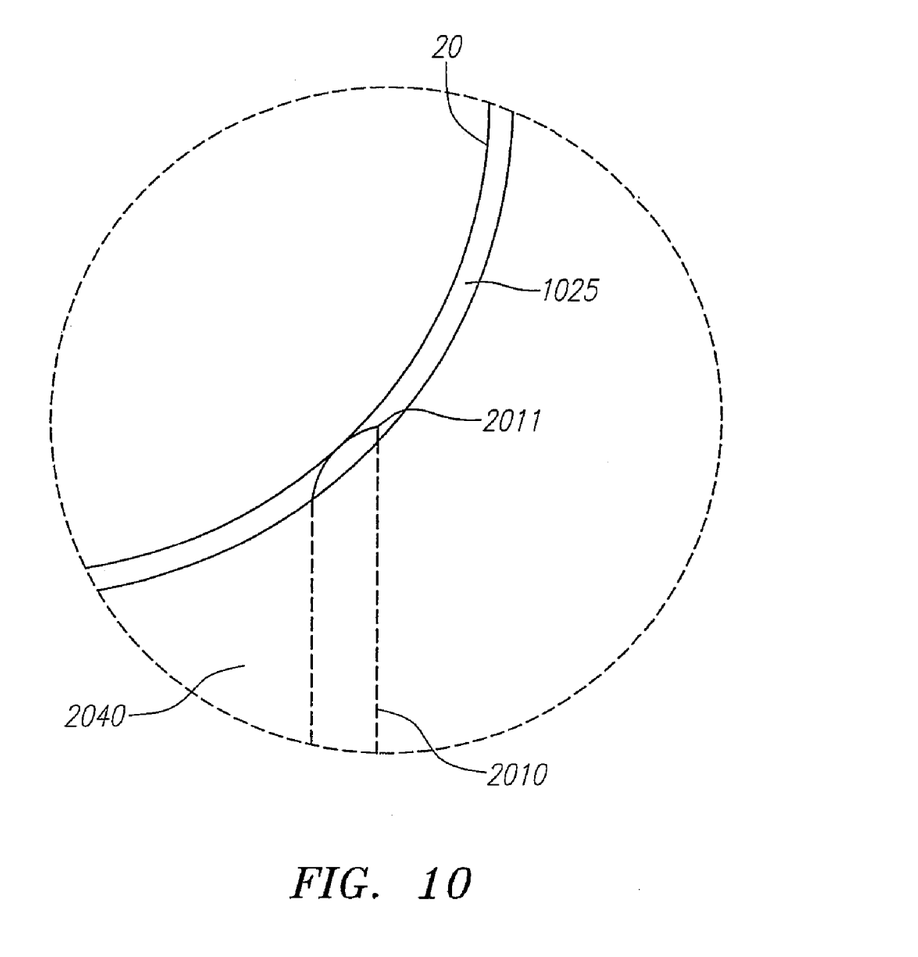
FIG. 10 is a detailed view of the region identified by circular dashed line 10 in FIG. 8.

FIG. 10 is a detailed view of the region identified by a circular-line 10 in FIG. 8. FIG. 10 illustrates in greater detail the orientation of the core 20 or intermediate ball assembly within the molding chamber 1025 and the engagement of that core 20 or ball assembly by a raised projection 2010. The core 20 is retained in a particular orientation by engagement of the raised projection 2010, and specifically, contact by a distal end 2011 of the raised projection 2010, which forms a deep aperture in the cover 30. While held in this position, the cover 30 is molded about the core 20 and specifically, within the region or void between the surface of the molding chamber 1025 and the outer surface of the core 20.

Figure 11:
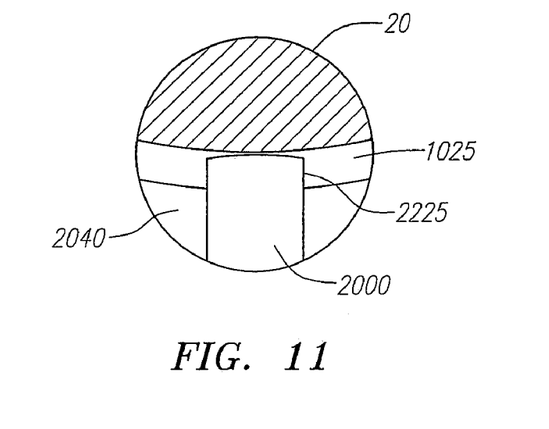
FIG. 11 is an isolated view of an alternative embodiment of a knock-out pin with a knock-out pin in a retracted state.
Figure 11A:
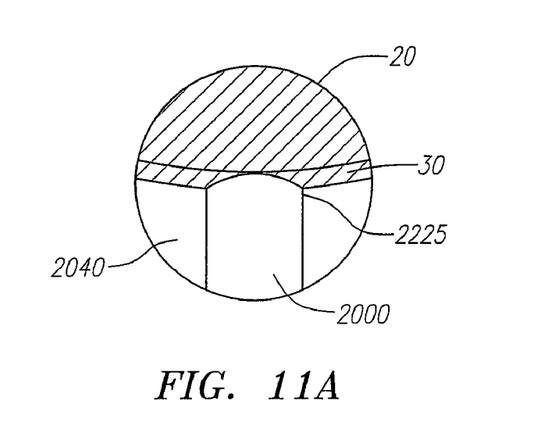
FIG. 11A is an isolated view of an alternative embodiment of a knock-out pin with a knock-out pin in a retracted state during the molding process.
Figure 11B:
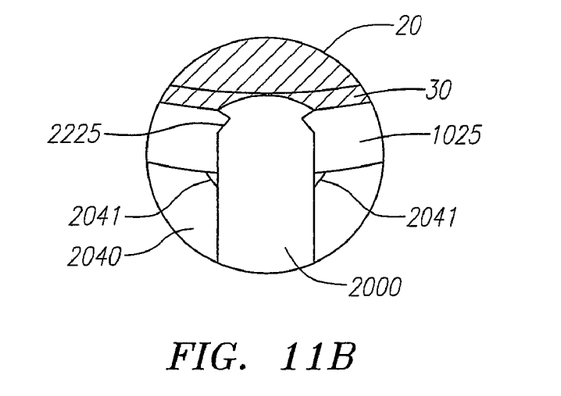
FIG. 11B is an isolated view of an alternative embodiment of a knock-out pin with a knock-out pin in an extended state during the demolding process.

In an alternative embodiment shown in FIGS. 11, 11A and 11B, a knock-out pin 2000 is selectively positioned relative to a core 20 or ball assembly within the molding chamber 1025 so as to form one or more deep apertures in the resulting golf ball 10 while at the same time positioning the core 20 in the molding chamber 1025 of the molding apparatus 1000. For example, the knock-out pin 2000 is positioned such that the distal end 2225 is extended into the molding chamber 1025 and contacts the core 20 or inner ball assembly retained within the molding chamber 1025. A suitable molding material is then administered into the chamber, and specifically within the void between the outer surface of the core 20 and the interior surface of the molding chamber 1025. The knock-out pin 2000 forms a deep aperture on the surface of the golf ball 10. After the cover material has sufficiently gelled or hardened, the knock-out pin 2000 is then extended to push the golf ball out of the molding chamber 1025. The liquid, low viscosity material never touches the knock-out pin 2000 because the knock-out pin 2000 remain in their retracted position until the material has gelled or hardened, thereby reducing or eliminating fouling of the knock-out pin 2000.

The knock-out pins described herein are selectively positionable throughout a molding cycle. Accordingly, the pins may be extended or retracted to any extent or degree before, during, or after a molding operation. For certain applications, it may be desirable to position the pins such that they are extended into the molding chamber during a molding operation so as to form deep dimples in a golf ball. After molding, the pins may be extended to displace the molded ball from the molding chamber.

The knock-out pins may be used at the poles as well as any other location on the golf ball, as desired. The use of the knockout pins 2000 at the pole locations provides more support for the core or intermediate ball, thereby improving the uniformity of the cover thickness because the ball is less likely to shift during the molding operation.

The preferred embodiment knock-out pins 2000 may serve one or more of the following functions: (i) supporting a core or intermediate ball assembly during molding, (ii) forming a traditional dimple or a deep aperture, and (iii) displacing or extracting the molded ball from the molding chamber. The present invention allows for faster molding and demolding times, preferably ranging from 10 seconds to 180 seconds, more preferably from 20 seconds to 120 seconds and most preferably from 20 seconds to 60 seconds. The time is measured from when the mold opens for insertion of a core till the unfinished golf ball is demolded from the molding apparatus 1000.

Generally, since molding material typically enters the molding chamber through an array of parting line gates arranged on the ball's equator, and moves toward the top and bottom poles of the ball, air or other gases may be trapped between the material flow front and the poles. Venting is accomplished by small gaps on the equator opposite where the material enters.

As noted, another function of the knock-out pins is to displace or otherwise move the molded ball out of the molding chamber. This is accomplished by extending the pins into their respective mold after the molding material has sufficiently solidified.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A molding apparatus adapted for forming a golf ball having one or more deep apertures, the apparatus comprising:
   a first mold having a first hemispherical molding surface that defines a substantially hemispherical molding cavity, the first mold having at least one aperture defined along the first hemispherical molding surface, the first mold having at least one retractable pin with a distal end, the first mold having at least one retractable pin capable of extending from the at least one aperture into the first hemispherical molding cavity a distance ranging from 0.002 inch to 0.140 inch, at least one retractable pin having a retracted state for forming a deep aperture in a golf ball during a molding operation, and an extended state for forcing a golf ball from the apparatus;
   a second mold having a second hemispherical molding surface that defines a second hemispherical molding cavity, the second mold having at least one aperture defined along the second hemispherical molding surface, the second mold having at least one retractable pin with a distal end, at least one retractable pin capable of extending from the at least one aperture into the second hemispherical molding cavity a distance ranging from 0.002 inch to 0.140 inch, at least one retractable pin having a retracted state for forming a deep aperture in a golf ball during a molding operation, and an extended state for forcing a golf ball from the apparatus;
   wherein the first mold and the second mold are adapted to engage each other such that the first hemispherical molding surface and the second hemispherical molding surface form a generally spherical molding chamber.

2. The molding apparatus of claim 1, wherein each of the at least one retractable pins of the first mold and the second mold has a diameter of from about 0.025 inch to about 0.250 inch.

3. The molding apparatus of claim 1, wherein the first mold and the second mold each comprises from one retractable pin to ten retractable pins.

4. The molding apparatus of claim 1, wherein the first hemispherical molding surface further comprises at least one outwardly extending projection having a height as measured from the first hemispherical molding surface of from about 0.002 inch to about 0.140 inch, and the second hemispherical molding surface further comprises at least one outwardly extending projection having a height as measured from the second hemispherical molding surface of from about 0.002 inch to about 0.140 inch.

5. A molding apparatus adapted for forming a golf ball with a plurality of deep apertures extending through a cover of the golf ball, the apparatus comprising:

a first mold having a first hemispherical molding surface that defines a substantially hemispherical molding cavity, the first mold having a plurality of raised protuberances adapted to form a plurality of deep apertures, the first mold having at least one aperture defined along the first hemispherical molding surface, the first mold having at least one retractable pin with a distal end, at least one retractable pin capable of extending from at least one aperture into the first hemispherical molding cavity a distance ranging from 0.002 inch to 0.140 inch, at least one retractable pin having a retracted state for forming a dimple in a golf ball during a molding operation, and an extended state for forcing a golf ball from the apparatus;

a second mold having a second hemispherical molding surface that defines a second hemispherical molding cavity, the second mold having a plurality of raised protuberances adapted to form a plurality of deep apertures, the second mold having at least one aperture defined along the second hemispherical molding surface, the second mold having at least one retractable pin with a distal end, the second mold having at least one retractable pin capable of extending from the at least one aperture into the second hemispherical molding cavity a distance ranging from 0.002 inch to 0.140 inch, the second mold having at least one retractable pin having a retracted state for forming a dimple in a golf ball during a molding operation, and an extended state for forcing a golf ball from the apparatus;

wherein the first mold and the second mold are adapted to engage each other such that the first hemispherical molding surface and the second hemispherical molding surface form a generally spherical molding chamber.

6. The molding apparatus of claim 5, wherein the at least one retractable pin of the first mold is positioned at a first pole location, and the at least one retractable pin of the second mold is positioned at a second pole location.

* * * * *